(12) United States Patent
Lepper et al.

(10) Patent No.: US 11,014,311 B2
(45) Date of Patent: May 25, 2021

(54) CONNECTING ARRANGEMENT FOR CONNECTING A FIBER COMPOSITE COMPONENT TO A SECOND COMPONENT

(71) Applicant: LEICHTBAU-ZENTRUM SACHSEN GMBH, Dresden (DE)

(72) Inventors: Martin Lepper, Dresden (DE); Werner Hufenbach, Dresden (DE); Enrico Ladusch, Dresden (DE); Jens Werner, Coswig (DE); André Kiessling, Dresden (DE)

(73) Assignee: LEICHTBAU-ZENTRUM SACHSEN GMBH, Dresden (DE)

( * ) Notice: Subject to any disclaimer, the term of this patent is extended or adjusted under 35 U.S.C. 154(b) by 801 days.

(21) Appl. No.: 14/362,694

(22) PCT Filed: Dec. 7, 2012

(86) PCT No.: PCT/DE2012/100372
§ 371 (c)(1),
(2) Date: Jun. 4, 2014

(87) PCT Pub. No.: WO2013/083124
PCT Pub. Date: Jun. 13, 2013

(65) Prior Publication Data
US 2014/0352880 A1 Dec. 4, 2014

(30) Foreign Application Priority Data

Dec. 7, 2011 (DE) .......................... 102011120360.9

(51) Int. Cl.
*B29C 65/70* (2006.01)
*B29C 65/56* (2006.01)
(Continued)

(52) U.S. Cl.
CPC .............. *B29C 65/70* (2013.01); *B29C 65/56* (2013.01); *B29C 66/0242* (2013.01);
(Continued)

(58) Field of Classification Search
CPC ... B29C 66/304; B29C 70/685; B29C 70/745; B29C 43/18; B29C 2043/181;
(Continued)

(56) References Cited

U.S. PATENT DOCUMENTS 4,613,393 A * 9/1986 Cattanach ............. B29C 43/021
156/155
4,891,176 A * 1/1990 Drysdale ................ B29C 70/48
264/250

(Continued)

FOREIGN PATENT DOCUMENTS

| CH | 644411 A5 | 7/1984 |
|----|-----------|--------|
| DE | 19608127 A1 | 9/1997 |

(Continued)

OTHER PUBLICATIONS

Gardiner, G., "Thermoformable Composite Panels", available online at https://web.archive.org/web/20110813010236/http://www.flexformtech.com/News/pdfs/Composites-World-Thermoformable-Composite-Panels.pdf, published on-line Mar. 7, 2011.*

(Continued)

*Primary Examiner* — Michael A Tolin
(74) *Attorney, Agent, or Firm* — Abel Schillinger, LLP

(57) ABSTRACT

Disclosed are a connecting arrangement of a fiber composite component with a second component and a process for producing the arrangement. The second component comprises at least one flat section having one or more cut-outs which pass through the flat section. The flat section is arranged between at least two sublayers of the fiber composite component and at least one of the at least two (Continued)

sublayers with a layer thickness $S_F$ comprises one or more embossments which have an essentially even layer thickness $S_F$ and are molded into the one or more cut-outs.

20 Claims, 12 Drawing Sheets

(51) Int. Cl.
*F16B 17/00* (2006.01)
*B29C 65/00* (2006.01)

(52) U.S. Cl.
CPC ........ *B29C 66/1122* (2013.01); *B29C 66/304* (2013.01); *B29C 66/43* (2013.01); *B29C 66/721* (2013.01); *B29C 66/81427* (2013.01); *B29C 66/81455* (2013.01); *B29C 66/83221* (2013.01); *F16B 17/008* (2013.01); *B29C 66/21* (2013.01); *B29C 66/431* (2013.01); *B29C 66/433* (2013.01); *B29C 66/474* (2013.01); *B29C 66/71* (2013.01); *B29C 66/7212* (2013.01); *B29C 66/7394* (2013.01); *B29C 66/73921* (2013.01); *B29C 66/742* (2013.01)

(58) Field of Classification Search
CPC ... B29C 2043/182; B29C 65/70; B29C 43/10; B29C 43/12; B29C 66/30321; B29C 66/30325; B29C 66/3034; B29C 2043/026; B29C 2043/189; B29C 43/183; B29C 66/30341; B29C 70/345; B29C 70/46; B29C 70/48; B29C 70/68–865; B29C 70/36; B29C 65/56; B29C 66/0242; B29C 66/1122; B29C 66/21; B29C 66/303; B29C 66/43; B29C 66/431; B29C 66/433; B29C 66/474; B29C 66/71; B29C 66/721; B29C 66/7212; B29C 66/73921; B29C 66/7394; B29C 66/742; B29C 66/81427; B29C 66/81455; B29C 66/83221; B29B 11/04; B29B 11/16; B29K 2023/12; B29K 2077/00; B29K 2307/04; B29K 2309/08; F16B 17/008
USPC ........................................................ 156/293
See application file for complete search history.

(56) References Cited

U.S. PATENT DOCUMENTS

| 2004/0119188 | A1* | 6/2004 | Lowe | B29C 70/50 264/131 |
|---|---|---|---|---|
| 2004/0130072 | A1* | 7/2004 | Sekido | B29C 70/443 264/408 |
| 2004/0197534 | A1 | 10/2004 | Miller | |
| 2005/0269016 | A1* | 12/2005 | Oldani | B29C 70/42 156/182 |
| 2006/0266713 | A1* | 11/2006 | Gearhart | B29B 13/023 210/767 |
| 2009/0278371 | A1* | 11/2009 | Fuchs | B23K 11/11 296/29 |
| 2013/0122246 | A1* | 5/2013 | Berger | F16B 5/08 428/119 |

FOREIGN PATENT DOCUMENTS

| DE | 19922799 | A1 * | 11/2000 | ............ B29C 70/48 |
|---|---|---|---|---|
| DE | 10238669 | A1 | 3/2004 | |
| EP | 0254363 | A1 * | 1/1988 | |
| EP | 1995040 | A1 * | 11/2008 | ........... B29C 43/203 |
| FR | 2783195 | A1 * | 3/2000 | ............ B29C 70/48 |
| WO | 2004020912 | A2 | 3/2004 | |
| WO | 2005054018 | A1 | 6/2005 | |

OTHER PUBLICATIONS

Machine translation of French Patent Publication No. FR-2783195A1, originally published Mar. 2000, 17 pages (Year: 2000).*
Machine translation of German Patent Publication No. DE-19922799A1, originally published Nov. 23, 2000, 15 pages (Year: 2000).*

* cited by examiner

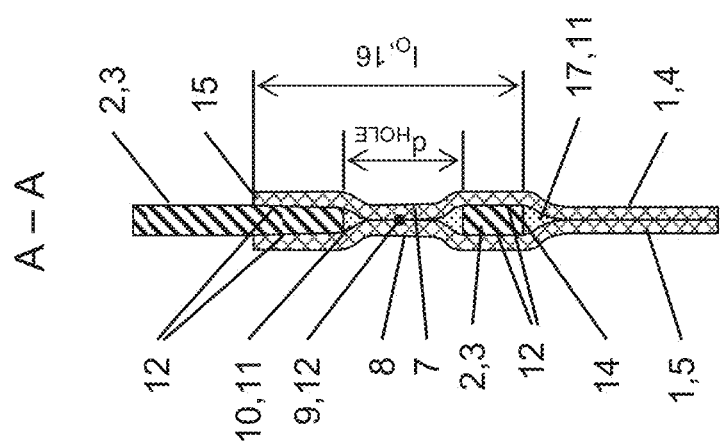
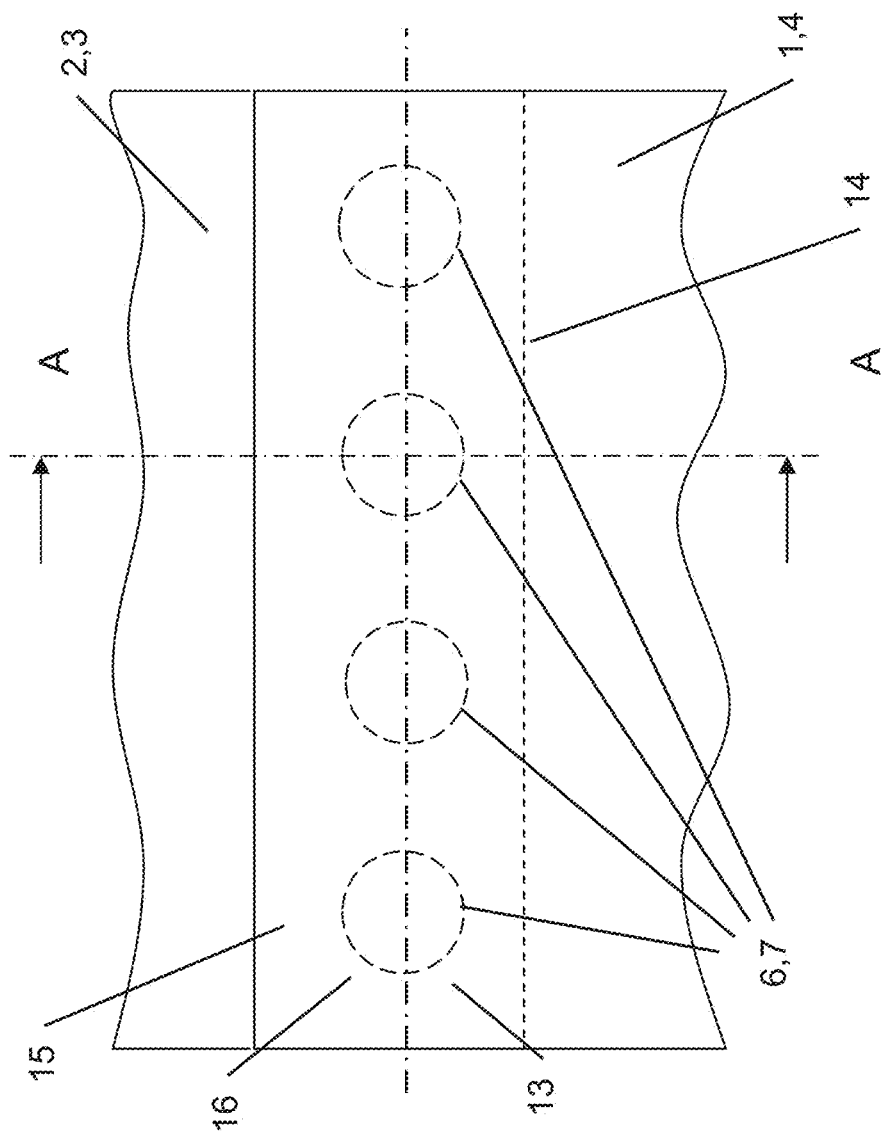

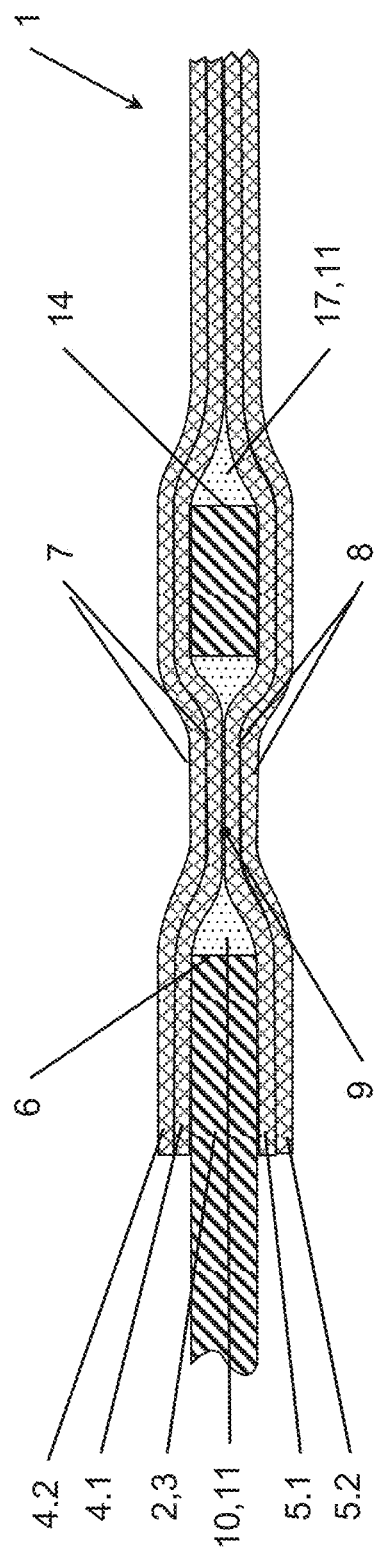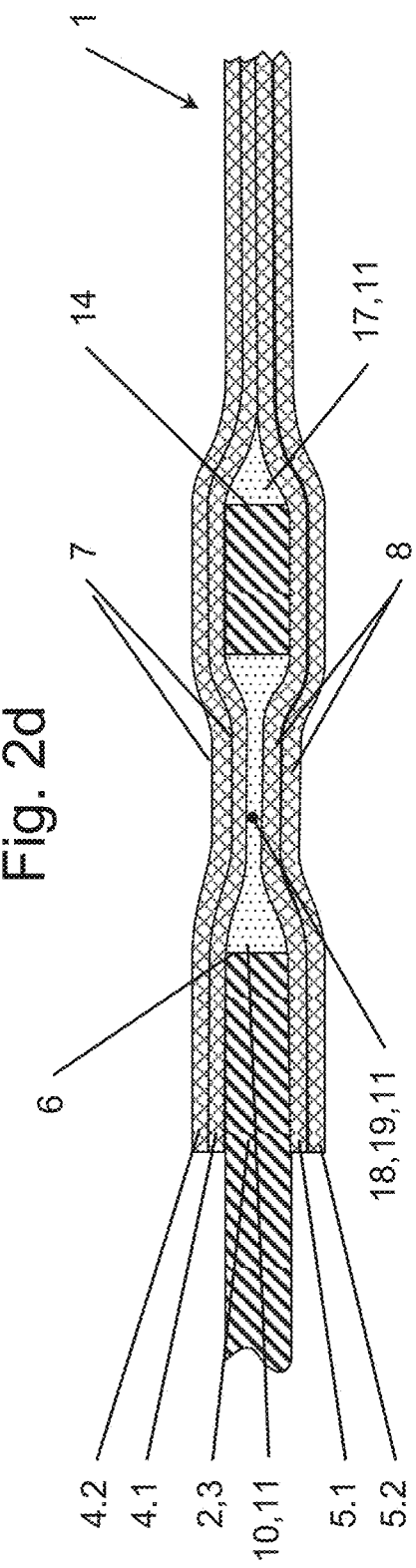

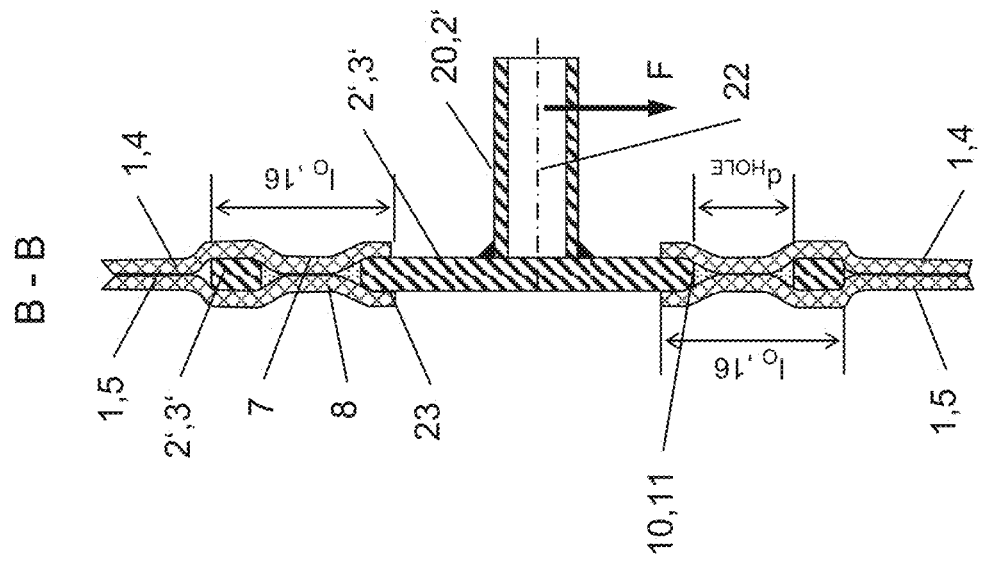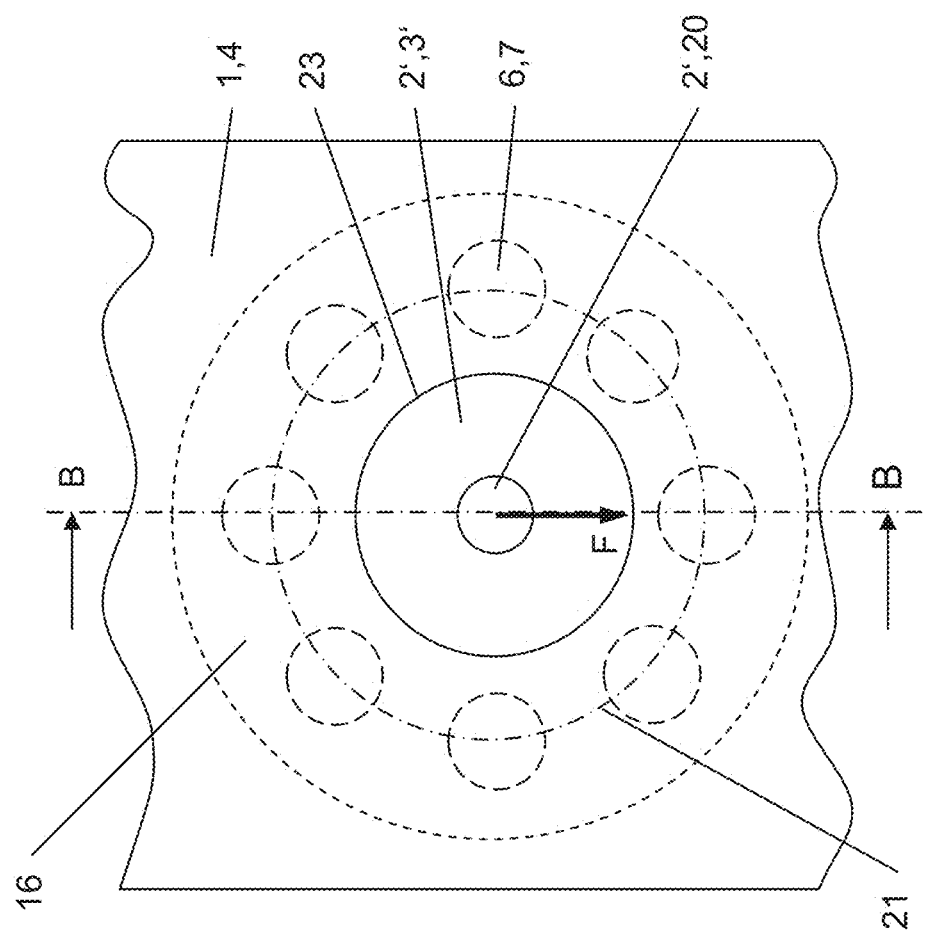

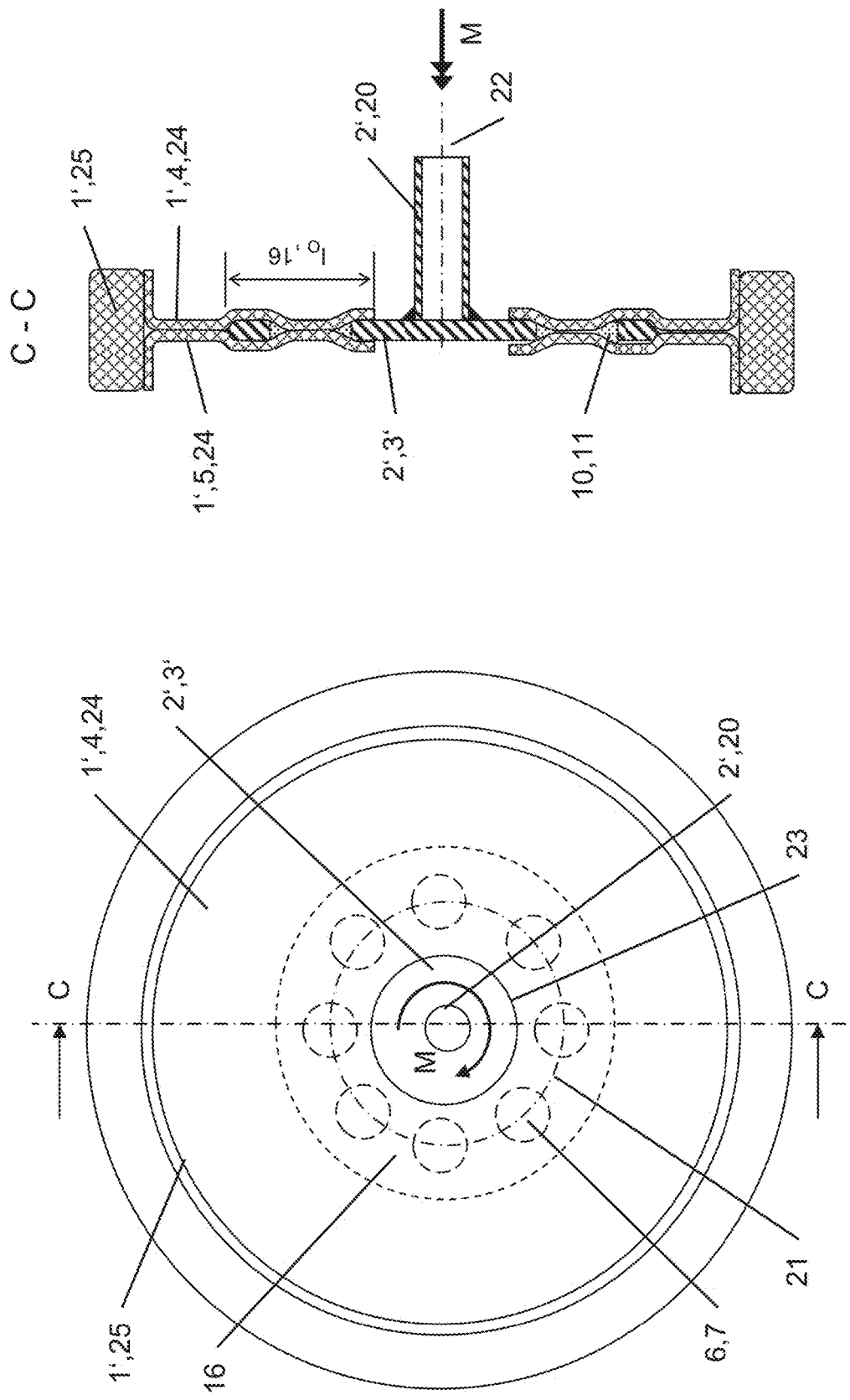

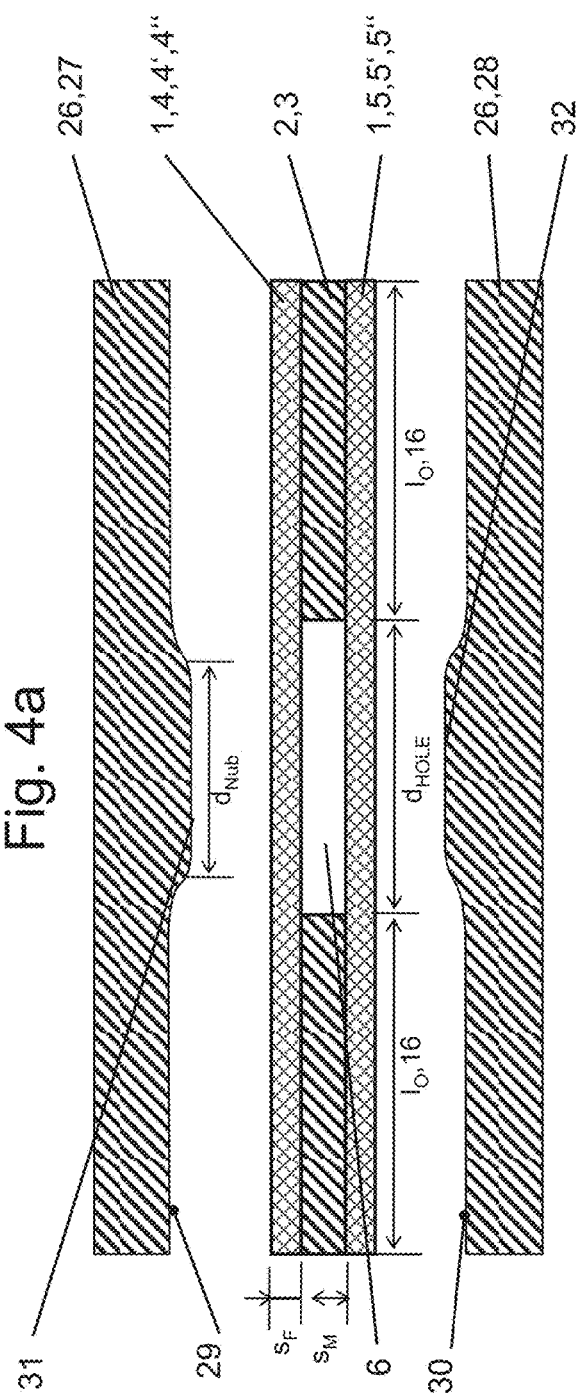
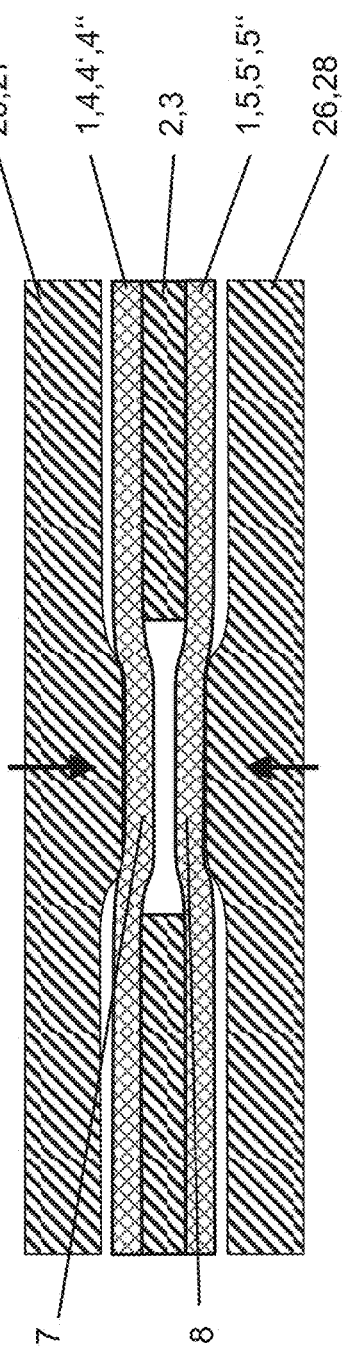

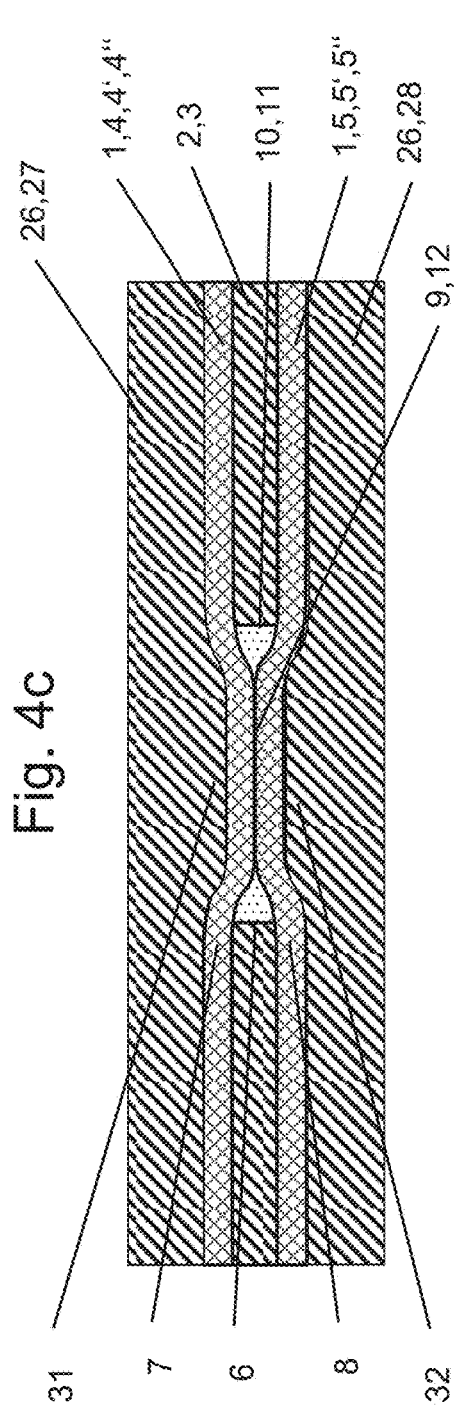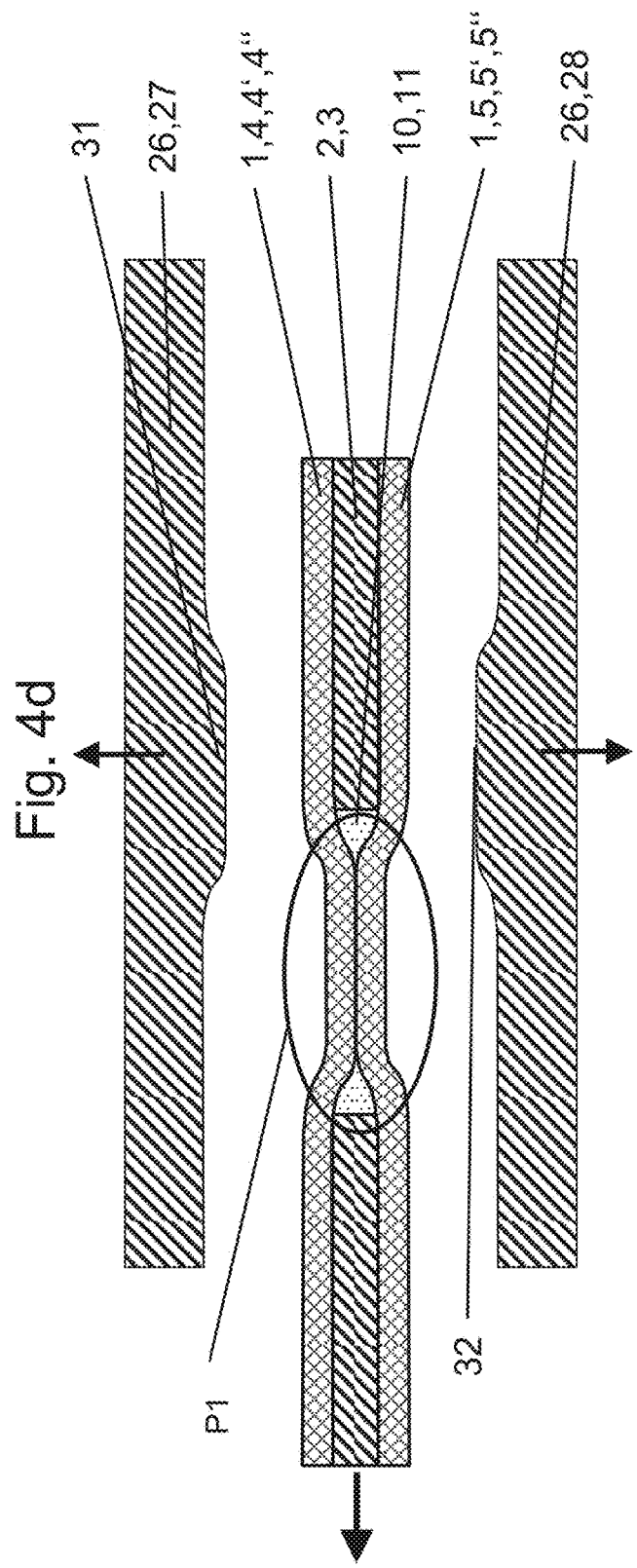

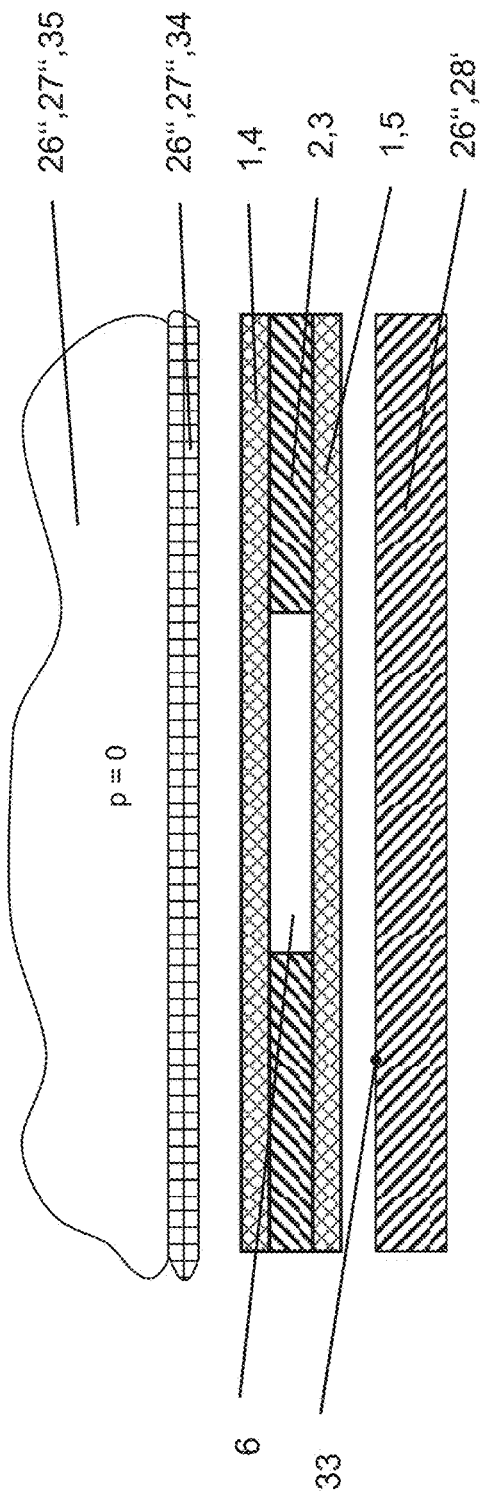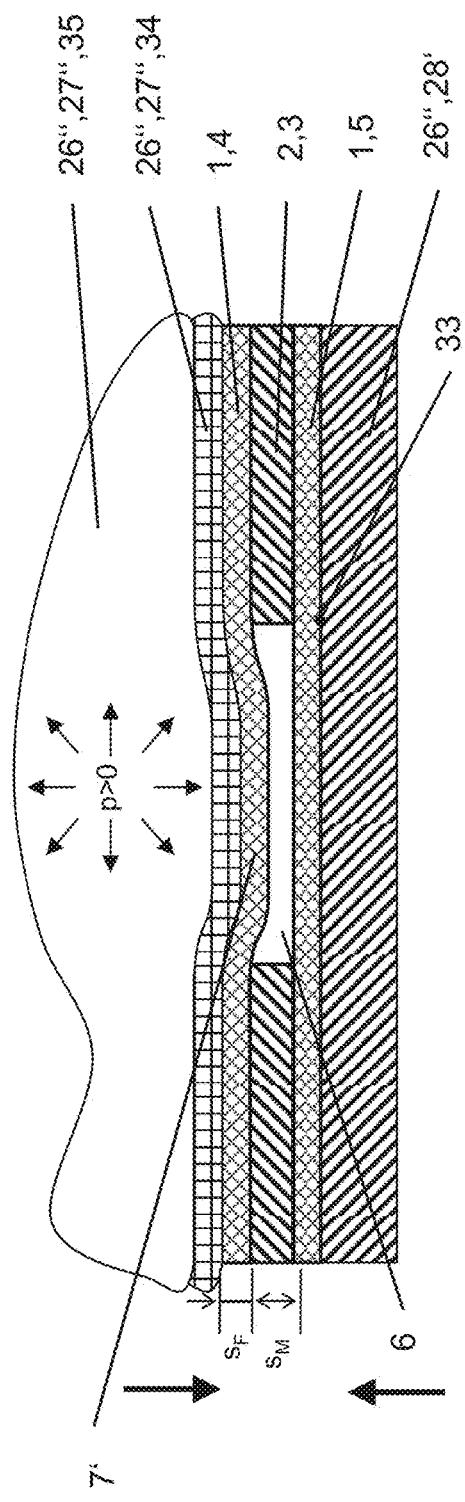

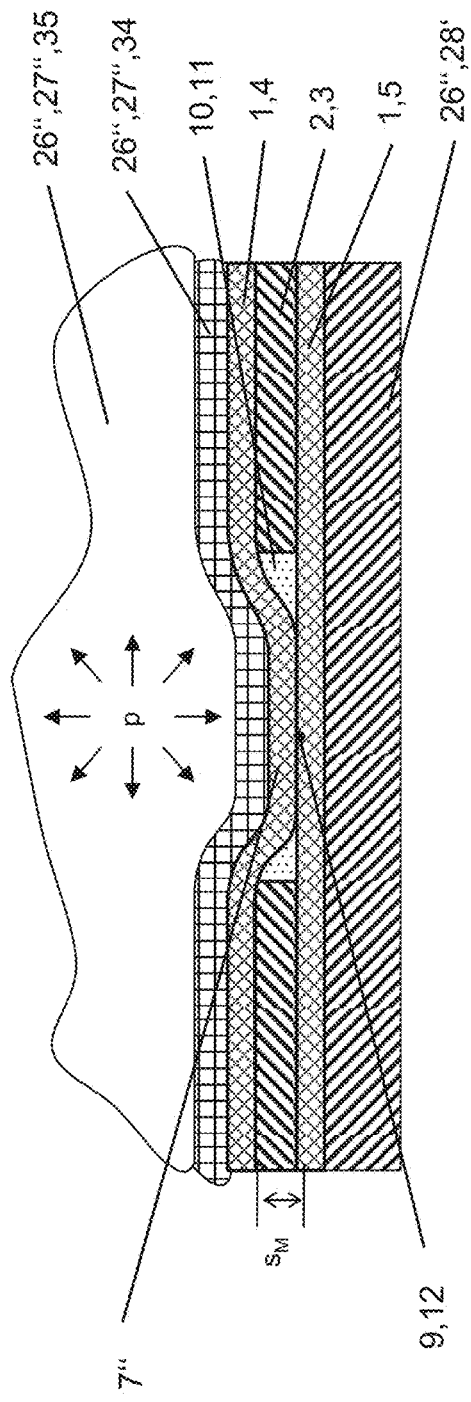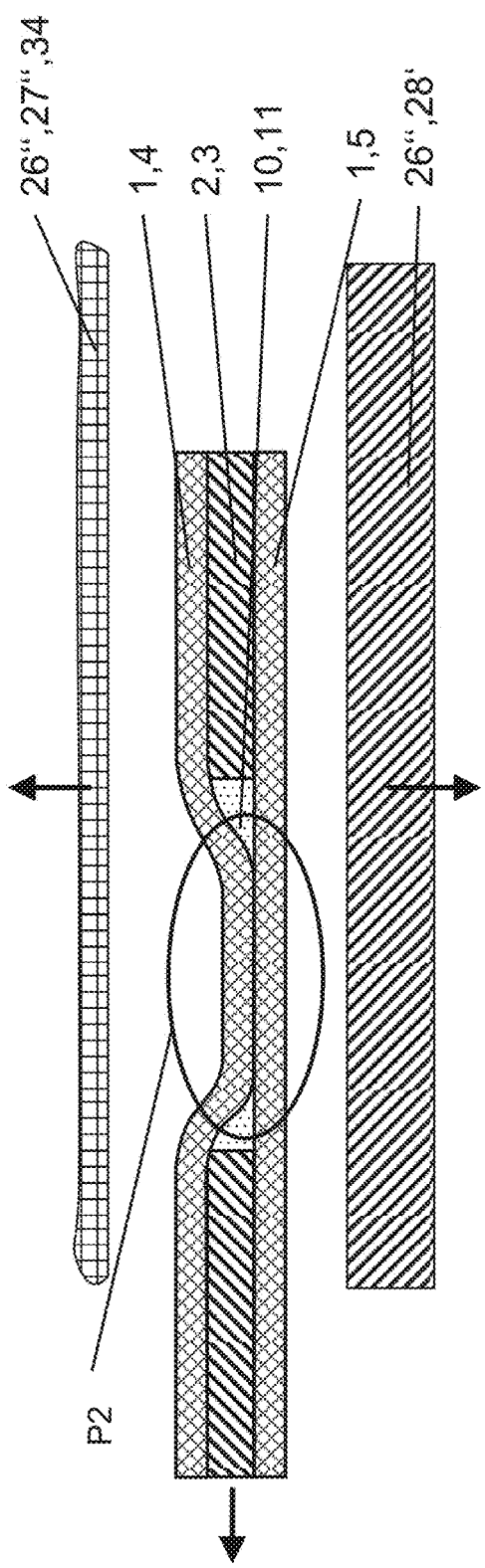

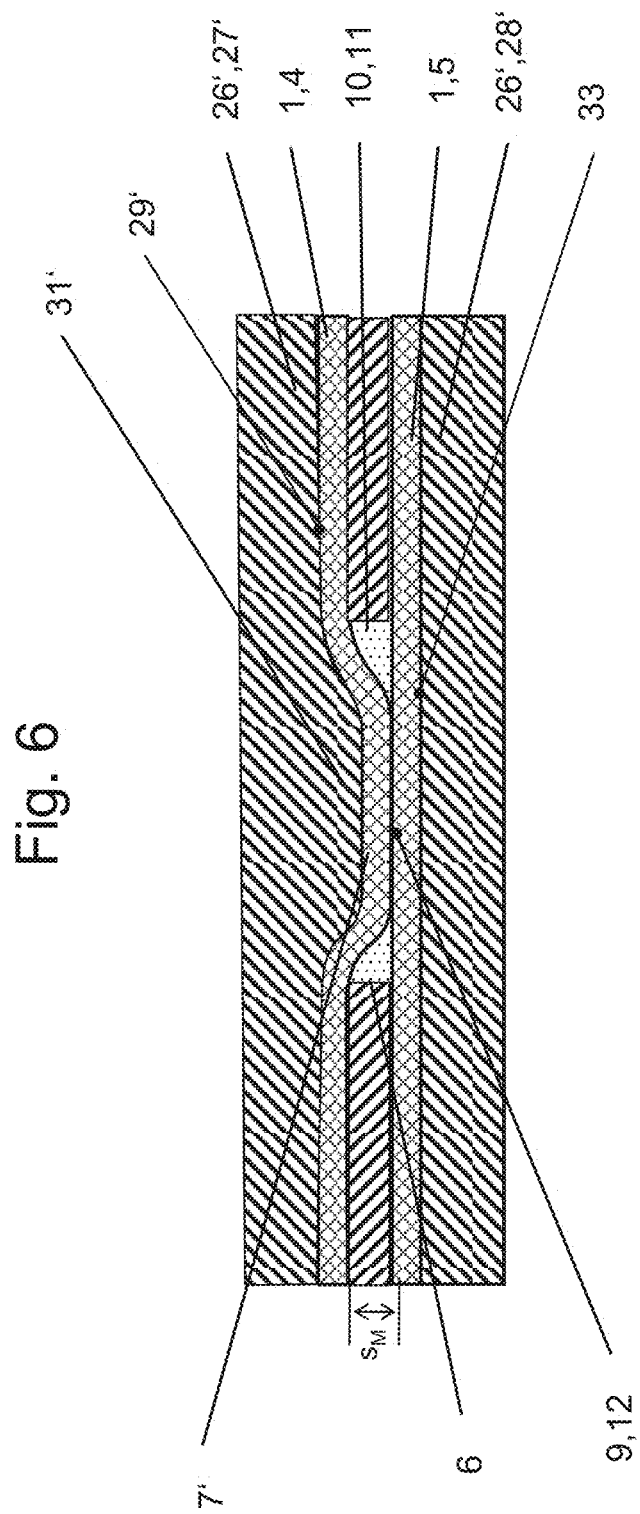

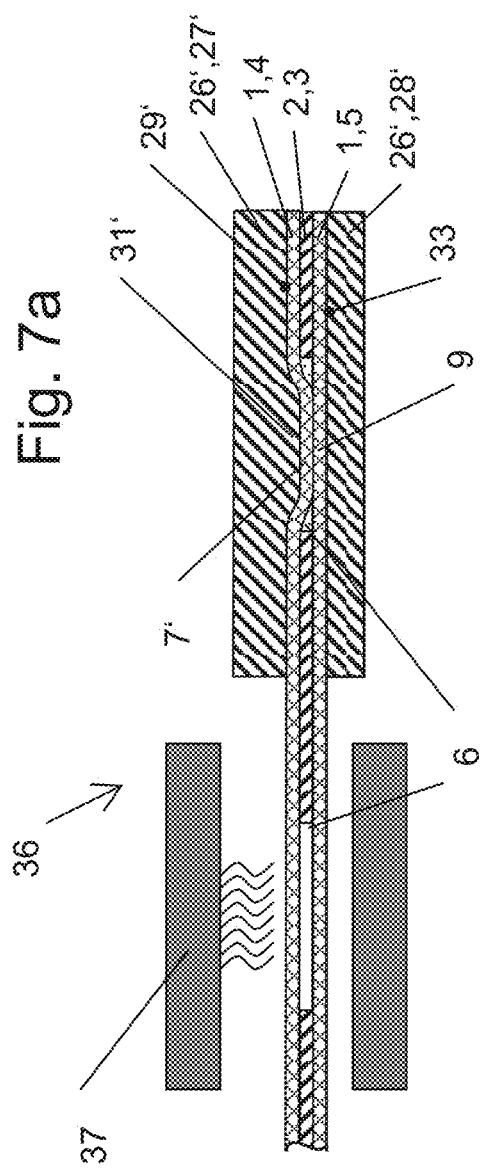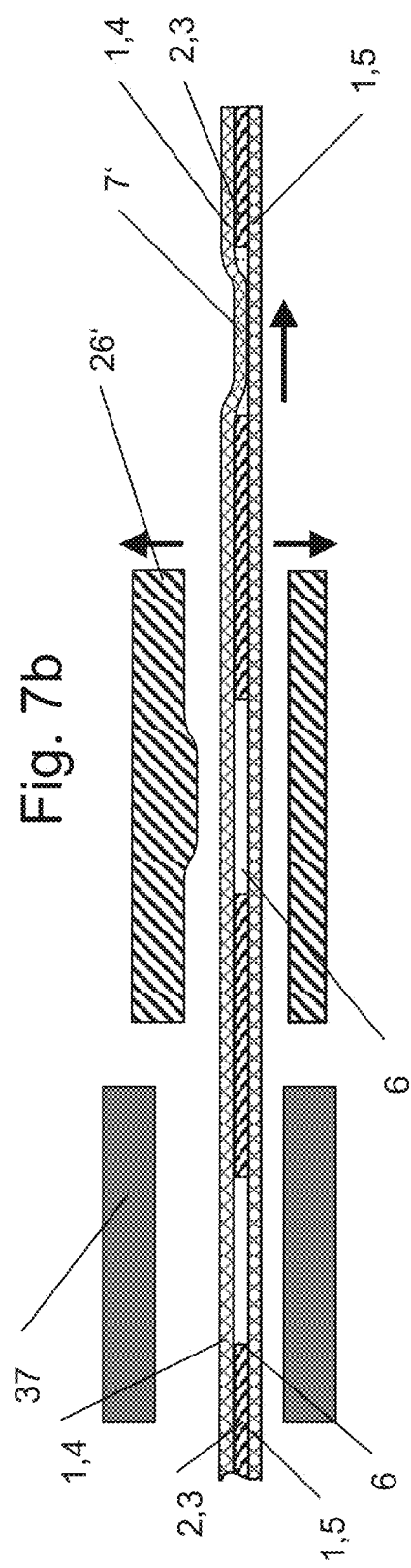

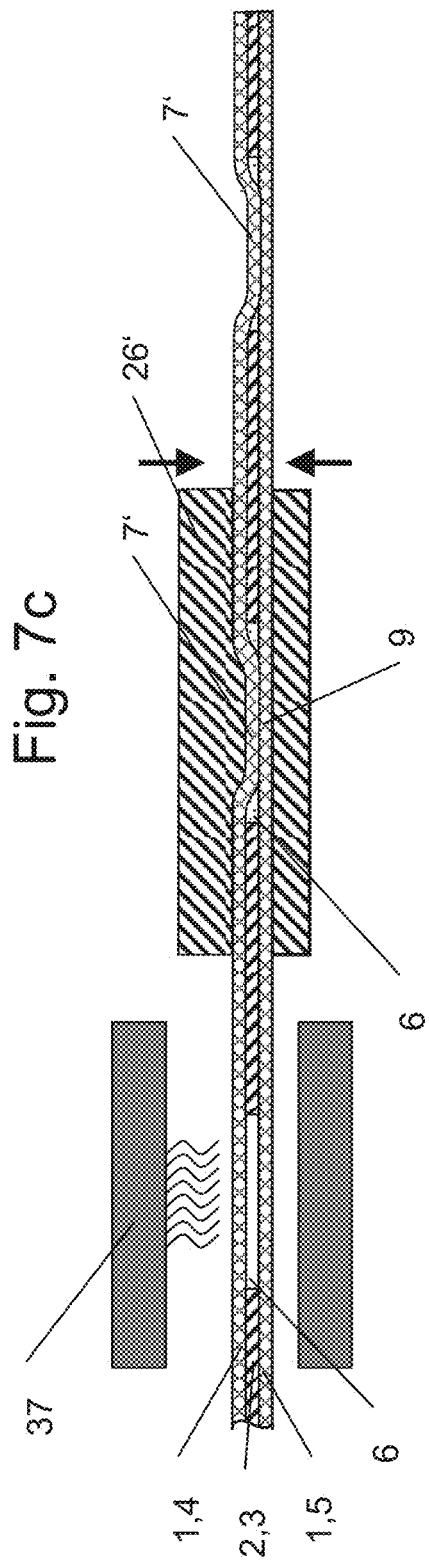

CONNECTING ARRANGEMENT FOR CONNECTING A FIBER COMPOSITE COMPONENT TO A SECOND COMPONENT

BACKGROUND OF THE INVENTION

1. Field of the Invention

The invention relates to a connecting arrangement for connecting a fiber composite component to a second component.

Furthermore, the invention relates to a method for producing such a connecting arrangement.

2. Discussion of Background Information

The combination of fiber composite components of any shape and size that are made of a fiber composite material with components made of other fiber composite materials or of non-fiber composite materials such as metal or plastic is well known.

As is known, the connection of fiber composite components of any shape and size that are made of a fiber composite material with components made of other fiber composite materials or of non-fiber composite materials such as plastic or metal or metallic structures is realized mainly by means of gluing, screw or rivet connection or by sewing. Connections of fiber composite components with components made of other plastics or fiber composite materials are mostly glued.

The publication DE 102 38 669 A1 describes a three-dimensional component which consists of a first component made from a metallic material connected to a component made from a fiber composite material. The disadvantage of such connections for which gluing has been used is often an insufficient or unreliable cohesiveness of the connection.

Connections of materials such as duraplastic fiber composite components with a thermoplastic component are very difficult to realize as well. The cohesiveness achieved is generally not satisfactory.

The production of screw and rivet connections of these components is also time-consuming and costly. Notably, a special connection component is needed for the production of these screw and rivet connections for the provision of which a separate production process is necessary and which has to be inserted during a further production stage. This has a strong influence on the manufacturing time and cost of the connection. In addition, this kind of connections is generally material-intensive, and despite this fact, a weakening of the material of the components, in particular of the fiber composite material of the fiber composite component can be observed.

The publication DE 196 08 127 A1 describes a method for the production of a three-dimensionally formed fiber composite component for which unformed layers of fiber are sewn together with local reinforcement parts such as metallic fixing components to form a planar, integral semi-finished fiber product. This semi-finished product is then formed into the three-dimensional component geometry and consolidated in a molding tool under the influence of pressure and heat.

The disadvantage of the connection of semi-finished fiber products by sewing is that separate machinery is needed for this production step and the sewing process is very time-consuming and costly. The sewing thread is an additional material which can influence the quality of the connection in an uncontrolled manner. Possible imperfections of the seam can represent a danger for the safety of the connection.

SUMMARY OF THE INVENTION

The invention has therefore the objective to create a low-complexity, cost-effective and high-strength connection between a component of fiber composite material and a second component of another fiber composite material or a non-fiber composite material and to provide a cost-effective process for the production of such a connection.

The objective according to the invention is achieved through a connecting arrangement with the characteristics of patent claim 1. The second component—which consists of another material than the fiber composite component—has hereby at least one flat section with one or more cut-out(s) which pass through the flat section. And this flat section is placed between at least two sublayers of the fiber composite component and at least one of these sublayers is moulded into the cut-out(s).

This solution creates a form fit of the fiber composite component with the second component. The form fit is hereby achieved by undercutting at least one of the two sublayers of the fiber composite component which lies flat against the second component in the area of the cut-out(s) of the second component. The embossment(s) or cut-out(s) of the adjoining sublayer and the connection of the two sublayers of the fiber composite component result in a secure and firm hold of the connection that has been formed once the fiber composite component is finished and hardened.

The invention is designed in such a way that there is a choice of undercutting both sublayers of the fiber composite component that lie flat against both sides of the second component in the area of the cut-out(s) of the second component. This would then create a double-sided form fit of the fiber composite component with the second component.

The form-fit connection of the flat sections of these components improves the quality of the connection of the component considerably without making additional special connecting elements or additional glues necessary.

The invention provides a solution for the objective through a method for producing this connecting arrangement with the features of patent claim 9.

According to the invention, the method in accordance with patent claim 9 suggests that the flat section of the second component is positioned between at least two sublayers of a pre-form of the fiber composite component in such a way that the sublayers lie against the flat section of the second component, at least one sublayer covers and overlaps flat one or more cut-out(s) that pass(es) through the flat section of the second component, subsequently at least one sublayer is moulded into the cut-out(s) by means of to molding tool, so that the pre-form of the fiber composite component connects to the second component in a tight form-fit, and the pre-form of the fiber composite component is consolidated before and after the demolding of the joined connecting arrangement.

The form fit and, if possible, also substance-to-substance bond between the fiber composite component with at least two sublayers and the second component is achieved through the enclosing of the flat section of the second component by the upper and lower sublayer of the fiber composite component. The form fit connection is created between the upper and lower sublayer in the area of the cut-out(s) of the second component.

During the forming process of at least one sublayer of the pre-form of the fiber composite component, the form fit connection is achieved in the shape of embossments in the sublayer(s) which are realised by means of a molding tool in the cut-out(s) of the second component which is inserted into the molding tool at the same time.

The connection is created simultaneously with the molding of the fiber composite component. This minimises the necessary production steps for the creation of the connecting arrangement.

In one process step the fiber composite component is formed and connected to the second component during which an undercut is created in the transition area between the embossment of the sublayer(s) and the second component. Preferably, the forming of the sublayers of the fiber composite component happens in the presence of or by adding matrix material with the result that the excess matrix material fills the remaining cavities of the undercut connection. The excess matrix material serves as filler material and contributes additionally to the stability of the connecting arrangement once the material is hardened.

During the consolidation of the pre-form of the fiber composite component that has been connected to the second component, i.e. during the setting or hardening process of the fiber composite material, the matrix material is carried over into a solid state and at the same time the two sublayers in the area of the cut-out(s) are fixed form-fit and preferably glued in one of the joint contact areas. During the consolidation and in the presence or by adding matrix material, one of the two sublayers can be glued to the second component at least in the flat border area around the cut-out.

The process according to the invention reduces the auxiliary materials and the necessary production steps for the production of the connecting arrangement, as no additional drilling, riveting or sewing is required due to the form fit and possibly also the substance-to-substance bond created. Despite the saving of special connecting elements and the corresponding production steps, an advantageous, high-strength connection between the components is achieved.

Preferably, a form fit connecting arrangement that is inherently stable is created already during the pre-form stage and can be removed from the molding tool before the consolidation. This reduces the production time in the molding tool and increases the utilisation rate of the molding tool.

After a positive further development of the method according to the invention the high-strength connection of the connecting arrangement between the fiber composite component and the second component can be realised by means of two parts of the tool. One or both tool surfaces for the molding of the sublayer(s) can be built inherently stable or unstable. The shape of the embossment in the sublayer(s) can be varied by means of different designs of the molding tool or the parts of the tool.

Further positive designs and further developments of the connecting arrangement and the production method according to the invention can be seen in the dependent claims and also in the descriptions and the associated drawings.

BRIEF DESCRIPTION OF THE DRAWINGS

The connecting arrangement and the method for its production according to the invention are explained in more detail with the help of application examples below. The attached drawings show in a stylised presentation in FIG. 1a a sectional view of a connecting arrangement of a fiber composite component with two sublayers with a flat section of a metallic component, FIG. 1b a sectional view of a connecting arrangement of a fiber composite component with two sublayers with a flat section of a metallic component according to a second application example, FIG. 2a a top view of a connecting arrangement of a fiber composite component with two sublayers with a flat section of a metallic component according to a third application example, FIG. 2b a sectional view of a connecting arrangement as shown in FIG. 2a, FIG. 2c a sectional view of a connecting arrangement as shown in FIG. 2a in a second application variant with four sublayers, FIG. 2d a sectional view of a connecting arrangement as shown in FIG. 2a in a third application variant with four sublayers and an intermediate layer, FIG. 3a a top view of a connecting arrangement of a fiber composite component with two sublayers with a flat section of a metallic component according to a fourth application variant, FIG. 3b a sectional view of the connecting arrangement as shown in FIG. 3a, FIG. 3c a top view of the connecting arrangement as shown in FIG. 3a in a second application variant, FIG. 3d a sectional view of a connecting arrangement as shown in FIG. 3c, FIG. 4a a sectional view of a two-part molding tool with a pre-form of the fiber composite component and a second component in a first production phase for the production of a connecting arrangement according to FIG. 1a, FIG. 4b a process arrangement as shown in FIG. 4a in a second production phase FIG. 4c a process arrangement as shown in FIG. 4a in a third production phase, FIG. 4d a process arrangement as shown in FIG. 4a in a fourth production phase, FIG. 5a a sectional view of a two-part molding tool with an inherently unstable form with a pre-form of a fiber composite component and a second component in a first production phase for the production of a connecting arrangement as shown in FIG. 1b, FIG. 5b a process arrangement as shown in FIG. 5a in a second production phase, FIG. 5c a process arrangement as shown in FIG. 5a in a third production phase, FIG. 5d a process arrangement as shown in FIG. 5a in a fourth production phase, FIG. 6 a sectional view of a two-part molding tool with a pre-form of the fiber composite component and a second component in a process arrangement for the production of the connecting arrangement as shown in FIG. 1b, FIG. 7a a sectional view of a production machine for the continuously clocked inline production of a connecting arrangement as shown in FIG. 2a with several embossments as shown in FIG. 2b, FIG. 7b the production machine as shown in FIG. 7a in a second production phase and FIG. 7c the production machine as shown in FIG. 7a in a third production phase.

DETAILED DESCRIPTION OF THE INVENTION

Figure 1A:
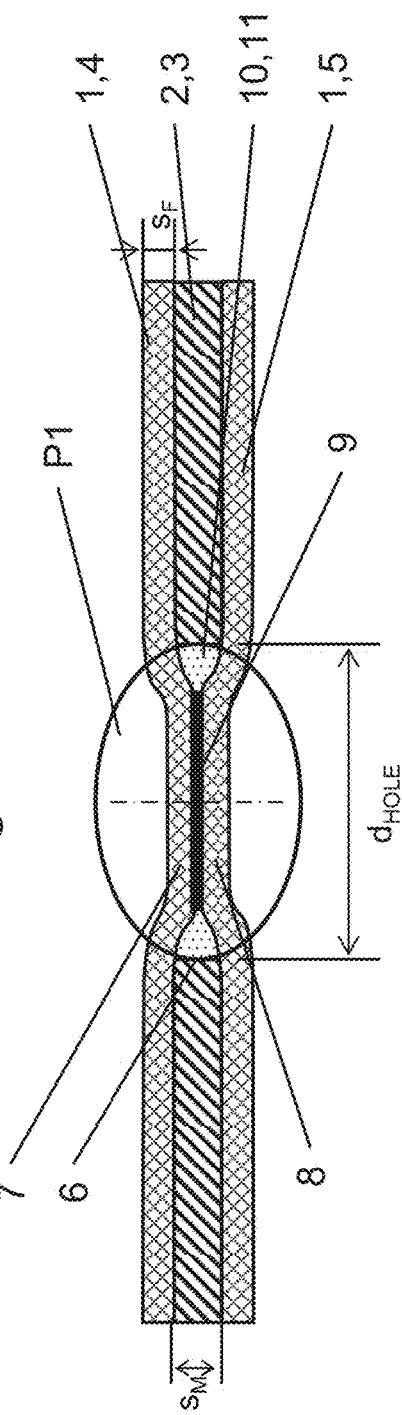

FIG. 1a shows a connecting arrangement of a fiber composite component 1 with a metallic component 2, the flat section 3 of which is placed between two sublayers 4, 5 of the fiber composite component 1 according to the invention. The fiber composite component 1 and the metallic component 2 are only shown in part. They can be any three-dimensionally formed components such as components of a car body which are put together according to the invention as shown in this application variant.

The flat section 3 of the metallic component 2 has a cut-out 6 in the shape of a hole 6 with a round hole cross-section that passes through the component 2. The diameter of the hole $d_{Hole}$ of the cut-out 6 in the application example is clearly larger than the thickness SM of the flat section 3 of the metallic component 2. The upper and the lower sublayers 4, 5 that are made of fiber composite material lie against an upper surface and a lower surface respectively of the flat section 3 of the metallic component 2. The upper as well as the lower sublayers 4, 5 of the fiber composite component 1 are moulded into the cut-out 6 and have embossments 7, 8 with a round cross-section which correspond to the form of the cut-out 6. In addition, the shape of the embossments 7, 8 of the upper and lower sublayers 4, 5 is determined by the thickness SM of the flat section 3 of the metallic component 2 and the layer thickness SF of the sublayers 4, 5 of the fiber composite component 1.

The embossments 7, 8 of the sublayers 4, 5 overlap in the area of the cut-out 6. The sublayers 4, 5 of the fiber composite component 1 are very stable and form-constant as an end product, which leads to a form-fit connection between the fiber composite component 1 and the metallic component 2. In the application example the embossments 7, 8 of the sublayers 4, 5 reach so far into the cut-out 6 that a common contact area 9 is formed and the cut-out 6 is enclosed completely.

The embossments 7, 8 of the upper and lower sublayers 4, 5 are, in addition, designed in the same way and reach approximately as deep, so that they form a mirror-symmetric arrangement and shape in the cut-out 6.

The connecting arrangement as shown in FIG. 1a is therefore provided with a symmetric embossment shape P1 of the sublayers 4, 5 of the fiber composite component 1.

The ring-shaped hollow space 10 which appears in the border area between the embossments 7, 8 of the upper and lower sublayers 4, 5 and the cut-out 6, is filled with the filler material 11, in particular with excess matrix material or other glue. In the hardened state of the filler material 11, the sublayers 4, 5 of the fiber composite component 1 are glued to each other and to the metallic component 2. This means that there is a substance-to-substance bond in addition to the form-fit connection between the fiber composite component 1 and the metallic component 2. The hardened filler material 11 in the ring-shaped hollow space 10 increases also the stability of the embossments 7, 8 of the upper and lower sublayers 4, 5 in the area of the cut-out 6 and supports therefore the form-fit connection. The hardened filler material 11 contributes therefore positively to the stability of the connecting arrangement in many ways.

Figure 1B:
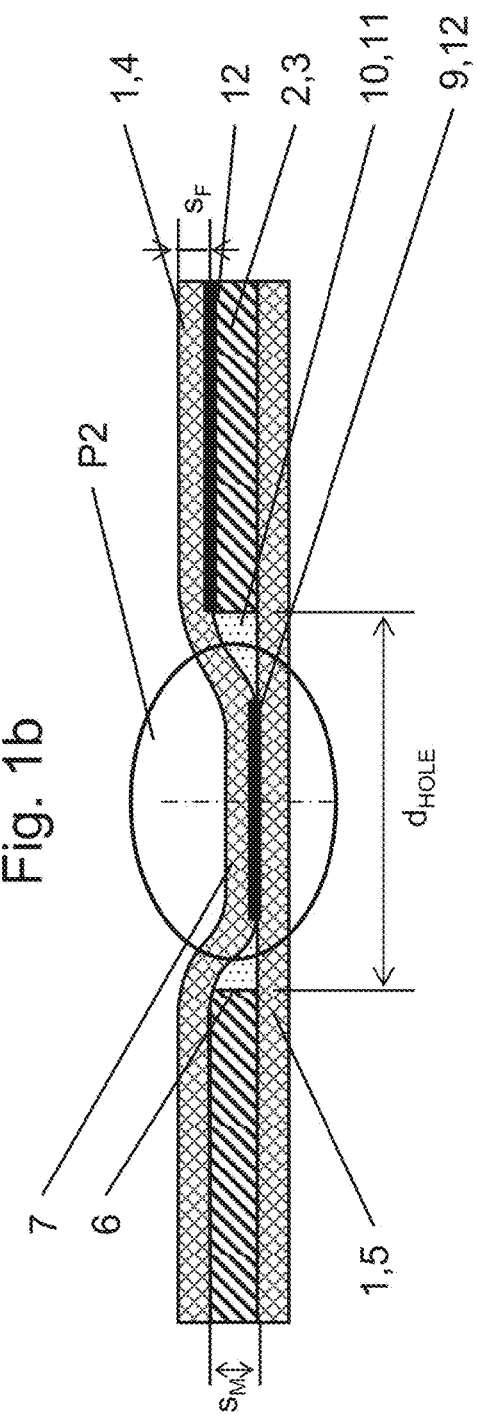

FIG. 1b shows an alternative connecting arrangement of a fiber composite component 1 with a metallic component 2 to the connecting arrangement of FIG. 1a according to a second application example. In order to avoid repetition we shall describe below only the features and components that are different from the connecting arrangement of FIG. 1a. Identical components with an identical function have the same reference numerals.

In contrast to the connecting arrangement of FIG. 1a, the connecting arrangement according to the second application example has an embossment 7 which is moulded into the cut-out 6 of the metallic component 2 only in the upper sublayer 4 of the fiber composite component 1. The lower sublayer 5 is completely planar—also in the area of the cut-out 6—and does not have any embossment. The embossment 7 of the upper sublayer 4 extends so far into the cut-out 6 that, nevertheless, both sublayers 4, 5 form a common contact area 9 and enclose the cut-out 6 completely. The depth of the embossment 7 in the upper sublayer 4 corresponds approximately to the thickness SM of the flat section 3 of the metallic component 2.

Accordingly, the connecting arrangement of FIG. 1b is characterized by an asymmetrical embossment shape P2 of the sublayers 4, 5 of the fiber composite component 1.

The realization of the embossment only in one sublayer—in the application example in the upper sublayer 4—reduces the pre-processing time and cost with respect to the shaping of the opposite layer, here the lower sublayer 5.

In addition, the lower sublayer 5 does not need to be as mouldable as the upper sublayer 4 which has to be mouldable in order to achieve the complete embossing depth.

The connecting arrangement of FIG. 1b has also an extended substance-to-substance bond between the fiber composite component 1 and the metallic component 2.

On the one hand, the sublayers 4, 5 are additionally connected to each other in the contact area 9 by means of excess matrix material or other glue. On the other hand, there is an adhesion surface 12 in the border area around the cut-out 6 on the upper surface of the flat section 3 of the metallic component 2, on which the upper sublayer 4 of the fiber composite component 1 is additionally bonded substance-to-substance with the metallic component 2.

The extra substance-to-substance bonding increases the stability of the connecting arrangement further.

Alternatively, an advantageous connecting arrangement with an asymmetrical embossment shape of the sublayers 4, 5 of the fiber composite component 1, which has not been shown, is planned. Hereby, the upper and lower sublayers 4, 5 have dissimilar embossments 7, 8 with especially different depths.

This connecting arrangement can be created by using upper and lower sublayers 4, 5 which consist in different mouldable, textile semi-finished products.

In a third application example as in FIGS. 2a to 2d, a further alternative connecting arrangement for the connecting arrangement of a fiber composite component 1 with a metallic component 2 as in FIG. 1a is shown. In order to avoid repetition we shall describe below only the features and components that are different from the connecting arrangement of FIG. 1a. Identical components with an identical function have the same reference numerals.

The connecting arrangement of FIGS. 2a to 2d has a metallic component 2 which has several round cut-outs which are arranged in a flat border area along a central line 13 and with equal distance to each other, as can be seen from the top view of FIG. 2a. In the application example, the central line 13 of the cut-outs 6 runs parallel with a straight component edge 14 of the metallic component 2.

The fiber composite component 1 also has a straight component edge 15 which, in the application example, runs parallel with the component edge 14 of the metallic component.

Between the component edge 15 of the fiber composite component 1 and the component edge 14 of the metallic component 2 there is a linear overlap area 16 with a width $l_O$, in which the flat border area of the metallic component 2 is covered on both sides by the upper and lower sublayer 4, 5 of the fiber composite component 1 (see FIG. 2a and FIG. 2b).

The upper and the lower sublayers 4, 5 of the fiber composite component 1 have each several embossments 7, 8 that correspond to the number, direction and shape of the cut-outs 6. The embossments 7, 8 of the upper and lower sublayer 4, 5 reach approximately equally deep into the cut-outs 6, thus forming a mirror-symmetrical embossment form P1 of the sublayers 4, 5 in the cut-outs 6. The high number of cut-outs 6 and embossments 7, 8 that are arranged at equal distance from each other and correspond to each other enhance considerably the quality of the form-fit connection between the fiber composite component 1 and the metallic component 2.

In the overlap area 16, an adhesion surface 12 is available on the upper and the lower sides of the flat section 3 of the metallic component 2 for a material connection of the metallic component 2 with the upper and/or lower sublayer 4, 5 of the fiber composite component 1. The linear overlap area 16 stretches with such a width $l_O$ that a sufficiently large adhesion surface 12 is guaranteed for the adhesive bond. A width of $l_O$ of the overlap area 16 that is greater than the double of the $d_{Hole}$ diameter of the hole ($1_{\ddot{U}} > 2 \times d_{Hole}$) has proven particularly advantageous.

The upper and the lower sublayer 4, 5 of the fiber composite component 1 are additionally connected materially in the area of all cut-outs 6 as well as beyond the component edge 14 of the metallic component 2 (cf. FIG. 2b).

In the ring-shaped hollow spaces 10 of the cut-outs 6 as well as in a longitudinally orientated hollow space 17 which is situated in the border area between the component edge 14 of the metallic component 2 and the upper and lower sublayer 4, 5, is filled up with filler material 11 according to the description of FIG. 1a. In the hardened state of the filler material 11, the sublayers 4, 5 of the fiber composite component 1 are glued several times to each other and to the metallic component 2.

With this application, a high-strength form-fit and firmly bonded connecting arrangement has been realized.

FIG. 2c shows a sectional view of the connecting arrangement as shown in FIG. 2a in an application variant in which the fiber composite component 1 has two upper sublayers 4.1, 4.2 and two lower sublayers 5.1, 5.2, i.e. four sublayers in total. The two upper sublayers 4.1, 4.2 and the two lower sublayers 5.1, 5.2 are each immediately form-fit and firmly bonded with each other and the upper sublayer 4.1 and the lower sublayer 5.1 which faces the metallic component 2 are form-fit and firmly bonded with each other and with the metallic component 2. These sublayers 4.1, 5.1 form contact area 9. The external upper sublayer 4.2 and the external lower sublayer 5.2 are therefore connected indirectly connected to the metallic component 2. The double-layered application of the upper and lower sublayers 4.1, 4.2, 5.1, 5.2 increase the stability of the form-fit connection and the intensity of the firmly bonded connection between the fiber composite component 1 and the metallic component 2.

FIG. 2d shows a sectional view of the connecting arrangement according to FIG. 2a in a second application variant, which is similar to the application in FIG. 2c. This connecting arrangement does also have two upper and two lower sublayers 4.1, 4.2, 5.1, 5.2. With regards to the coinciding features we therefore refer to the description of FIG. 2c.

In contrast to the application as shown in FIG. 2c, the upper and lower sublayers 4.1, 5.1 that each face the metallic component, are not immediately connected to each other in the area of the cut-outs, but show a distance from each other. A remaining flat hollow space 18 between the sublayers 4.1, 5.1 that are placed at a distance from each other is filled up with filler material 11 as shown in the description at FIG. 1a and forms an intermediate layer 19. In this way, the facing upper and lower sublayers 4.1, 5.1 are firmly bonded indirectly, i.e. by means of the intermediate layer 19, which consists of matrix material, in the area of the cut-outs 6.

FIGS. 3a to 3d represent a connecting arrangement, according to the invention, of a fiber composite component 1 with a circular disc-shaped, rotationally symmetric section 3' of a metallic component 2' according to a fourth application example. The fourth application example relates to a specific design of the Connecting arrangement as shown in FIG. 1a. In order to avoid repetition we shall describe below only the features and components that are different from the Connecting arrangement of FIG. 1a. Identical components with an identical function have the same reference numerals.

The application arrangement as described in the fourth application example has a rivet-like metallic component 2', a so-called Bighead 2', which includes a circular disc-shaped, rotationally symmetrical section 3' and a bar-shaped section 20. The Bighead 2' serves in the application example as shown in FIGS. 3a, b the selective application of a force F which is applied to the bar-shaped section 20 into the flat structure of the fiber composite component 1. In a border area of the circular disc-shaped section 3, eight round cut-outs or holes 6 are arranged along a circular central line 21 and in equal distance to each other, as can be seen in the top view as shown in FIG. 3a. The central line 21 of the cut-outs 6 runs concentrically to the longitudinal axis 22 of the bar-shaped section 20 and the congruent rotational axis of the circular disc-shaped section 3' of the Bighead 2'.

The upper and lower sublayer 4, 5 of the fiber composite component 1 has a round opening with a circumferential edge 23. In the overlap area 16 of the upper and lower sublayer 4, 5 with the circular disc-shaped section 3' of the metallic component 2', the sublayers 4, 5 have each eight embossments 7, 8 that correspond to the arrangement and form of the holes 6. The embossments 7, 8 of the upper and lower sublayers 4, 5 reach all equally far into the holes 6, so that they form a mirror symmetrical embossment form P1 of the sublayers 4, 5 in the holes 6 (cf. FIG. 3b). The concentrically arranged holes 6 and embossments 7, 8 that are placed at equal distance of each other and that correspond to each other, create a high quality, form-fit connection between the fiber composite component 1 and the Bighead 2', which is suitable for transmitting the force F that is applied to the Bighead 2' onto the fiber composite component.

The top view as shown in FIG. 3c and the sectional view as shown in FIG. 3d show in a similar application variant to the connecting arrangement as shown in FIGS. 3a, 3b a connecting arrangement in which the Bighead 2' is connected to a rotationally symmetrical fiber composite component 1' such as a flywheel 1'. The rotationally symmetrical fiber composite component 1' includes a circular disc-shaped section 24 with an edge that is flanged on the external circumference and that has a ring-shaped fiber composite wrapping 25, which forms the flywheel mass (cf. FIG. 3d). In order to form the flanged edge, the two sublayers 4, 5 end at the external circumference of the circular disc-shaped section 24 strutted apart from each other in a right angle. The ring-shaped fiber composite wrapping 25 is connected to the two strutted ends of the sublayers 4, 5 by means of gluing.

The Bighead 2' that is integrated into the circular disc-shaped section 24 of the fiber composite component 1' analogously with the connecting arrangement as shown in FIG. 3a is rotating in this application example and serves the insertion of a torque M that is applied to the bar-shaped section 20 of the Bighead 2' into the rotationally symmetrical fiber composite component 1'. The rotationally symmetrical fiber composite component 1' transmits the torque M into the flywheel mass of the ring-shaped fiber composite wrapping 25. The connecting arrangement according to the invention provides a high-quality form-fit connection between the rotationally symmetrical fiber composite component 1' and the Bighead 2', which is suitable for transmitting the torque applied to the Bighead 2'.

FIGS. 4a to 4d show in four application arrangements a method according to the invention for the production of the connecting arrangement of a fiber composite component 1 with a metallic component 2 as shown in FIG. 1a. The method is based on a thermoplastic formation method.

FIG. 4a represents a first production phase for the production of the connecting arrangement as shown in FIG. 1a. A detail of a two-part molding tool 26 with an upper tool part 27 and a lower tool part 28 can be seen here. The two-part molding tool 26 is shown in an open position. A prepared pre-form of the fiber composite component 1 with two sublayers 4, 5 is placed between the upper and the lower tool part 27, 28. A prepared flat section 3 of the metallic component 2 is inserted between the two sublayers 4, 5.

A circular cut-out 6 with a diameter of the hole $d_{Hole}$ was first drilled into the flat section 3 of the metallic component 2 which is to be connected to the fiber composite component 1.

For this application example, the starting products for the pre-form of the fiber composite component 1 are two sublayers 4, 5 made of so-called "organic sheet". The organic sheets are flat sheets made of thermoplastic material (e.g. PP-polypropylene, PA-polyamide or the like), which are provided with a mesh reinforcement (e.g. carbon or fiber glass). These organic sheets are first made mouldable. To this effect, the matrix material contained in them is melted e.g. by means of thermal radiation under an infrared field and converted into a liquid or highly viscous state of aggregation (not shown).

After that, the flat section 3 of the metallic component 2 is positioned between the two heated pre-form sublayers 4, 5, in such a way that the cut-out 6 of the metallic component 2 is situated in an overlap area 16 of the sublayers 4, 5 of the fiber composite component 1, and the two sublayers 4, 5 lie flat against the flat section 3.

After having been prepared in this way, the arrangement of the pre-form of the fiber composite component 1 and the flat section 3 of the metallic component 2 are placed between the—preferably cold—tool parts 27, 28.

The upper and the lower tool parts 27, 28 of the molding tool 26 have each a dimensionally stable tool surface 29, 30 with each a nub 31, 32 which are of equal size and form and pointing towards each other. The nubs 31, 32 correspond to the form of the cut-out 6 of the metallic component 2 and are therefore of round shape with a certain nub diameter $d_{Nub}$.

For the production of connecting arrangements with several cut-outs 6 in the flat section 3 of the metallic component 2, a suitable molding tool (not shown) with 6 correspondent nubs depending on the number, arrangement and shape of the cut-outs shall be provided.

The prepared pre-form of the fiber composite component 1 with the flat section 3 of the metallic component 2 is positioned between the tool parts 27, 28 in such a way that the cut-out 6 is placed centrically to the nubs 31, 32.

When the forming tool 26 is closed during the production phase as shown in FIG. 4b, during which the tool parts 27, 28 move towards each other in direction of the arrows, the soft and mouldable sublayers 4, 5 are formed and the fiber composite material is moulded against the flat section 3 of the metallic component 2 and moulded into the cut-out 6.

Hereby, suitable embossments 7, 8 of the sublayers 4, 5 are produced in the cut-out 6 by means of the two nubs 31, 32 of the tool parts 27, 28.

The shape of the embossments 7, 8 in the sublayers 4, 5 of the fiber composite component 1 and with it that of the nubs 31, 32 of the tool parts 27, 28 depends significantly on the layer thickness $s_F$ of the sublayers 4, 5, the thickness $s_M$ of the flat section 3 of the metallic component 2 and on the shape and size of the hole 6 in the metallic component 2. This means, the diameter of the nubs 31, 32 $d_{Nub}$ with reference to the diameter of the hole $d_{Hole}$ should preferably not be larger than the diameter of the hole $d_{hole}$ minus the double layer thickness $s_F$ of the sublayers 4, 5 ($d_{Nub} \leq d_{Hole} - 2 \times s_F$). This serves to largely avoid fiber damage in the formed fiber composite component 1.

During the production phase as shown in FIG. 4c, the molding tool 26 is completely closed. As a result of the forming process, an undercut of the sublayers 4, 5 is created in the cut-out 6, which produces a form fit with the metallic component 2. The embossments 7, 8 which have been formed in equal shape and depth create a connecting arrangement with a symmetrical embossment form P1.

The two embossments 7, 8 of the sublayers 4, 5 are made so deep that they touch and form a contact area 9. In order to be able to create this contact area 9 of the embossments 7, 8 of the sublayers 4, 5, it is an advantage if the diameter of the hole $d_{Hole}$ of the cut-out 6 is not made wider than the thickness $s_M$ of the flat section 3 of the metallic component 2.

In addition, the nub diameter $d_{Nub}$ and consequently the diameter of the hole $d_{Hole}$ of the cut-out 6 should be so wide that a sufficiently large adhesion surface 12 is available in the contact area 9 between the embossments 7, 8 of the upper and the lower sublayer 4, 5.

As an alternative to the application example in FIGS. 4a to 4d, a molding tool 26' can be used which has a tool part with an even tool surface which is not designed for the molding of a sublayer. Such a process variant is shown in FIG. 6. The alternative molding tool 26' has an upper tool part 27' with a dimensionally stable, embossed tool surface 29' and a lower tool part 28' with a dimensionally stable, even tool surface 33. FIG. 6 shows the alternative molding tool 26' in a production phase corresponding to the production phase as shown in FIG. 4c in which the molding tool 26' is completely closed. The depth of the nub 31' on the tool surface 29' of the upper tool part 27' is such that the depth of the embossment 7' produced in the upper sublayer 4 of the fiber composite component corresponds approximately to the thickness $S_M$ of the flat section 3 of the metallic component. The embossment 7' of the sublayer 4 touches the sublayer 5 that has remained even and with which it forms the contact area 9 with the adhesion surface 12. The one-sided embossment 7' of the upper sublayer 4 creates a connecting arrangement with an asymmetrical embossing mould P2. The alternative molding tool 26' is therefore suitable for the production of the connecting arrangement of a fiber composite component 1 with a metallic component 2 as shown in FIG. 1b.

The alternative method has the advantage that the molding tool 26' is more cost-effective. The production of tool part 28' used with an even tool surface 33 costs less time and effort and the allocation of the tool parts 27', 28' to each other is simpler. Apart from that, the method illustrated by FIGS. 4a to 4d applies also to a method with the alternative molding tool 26' as shown in FIG. 6.

In FIG. 4c we can see that an excess of matrix material 11 is accumulated between the sublayers 4, 5 during the forming, so that the ring-shaped hollow space 10 of the undercut between the sublayers 4, 5 and the cut-out 6 that appears during the process is filled up.

Already during the closing of the tool parts 27, 28 in the production phase shown in FIG. 4b or after the two tool parts 27, 28 have reached their end position as shown in FIG. 4c, the cooling and hardening (consolidation) of the matrix material 11 between the reinforcement mesh and in the hollow space 10 starts. The thermoplastic matrix material 11 passes on into the solid state of aggregation.

Preferably, the matrix material 11 is cooled down even quicker by an additional permanent cooling of the two tool parts 27, 28, so that the consolidation is sped up.

After the forming and consolidation process, the connecting arrangement is kept in the molding tool 26 as long as it takes for the sublayers 4, 5 of the fiber composite component 1 to cool down enough to be able to remove the bonded components 1, 2 from the opened tool parts 27, 28 without damaging them while retaining the shape of the connecting arrangement. This production phase is shown in FIG. 4d.

This process can be carried out with little effort and is based on the use of simple tools and few technical aids. The result of this process is the creation of an effective form fit and substance-to substance bond between the fiber composite component 1 and the metallic component 2 and therefore the achievement of a high-strength connection between the components 1, 2.

A further essential advantage of this process according to this application example is that selected areas that need to be connected (contact area 9 between the sublayers 4, 5 to each other and adhesion surfaces between the sublayers 4, 5 and the flat segment 3 of the metallic component 2) can be heated up even before the forming and cooled down already during the forming process. As a result, particularly short cycle times can be achieved for the production of the connecting arrangement.

The process described above and as shown in FIGS. 4a to 4d can be varied with different process variants. In order to avoid repetition we shall explain in the description of the process variants below only the features and components that are different from the process of FIGS. 4a to 4d. Identical components with an identical function have the same reference numerals.

In a first process variant, the flat section 3 of the metallic component 2 is placed between two dry mesh sublayers 4', 5' of a pre-form of the fiber composite component, using an infiltration process. The connecting arrangement prepared in this way is then positioned immediately between the tool parts 27, 28. When the two tool parts 27, 28 are closed according to FIGS. 4a to 4c, the dry mesh sublayers 4', 5' are moulded in the cut-out 6. At this point in time, there is as yet no matrix material. This matrix material 11 is infiltrated into the mesh sublayers 4', 5' and the hollow spaces once the two tool parts 27, 28 have reached their end position (FIG. 4c). To this effect, the two tool parts 27, 28 are pressure-sealed together, a vacuum is created, and a thermosetting two-component mixture in liquid form is injected between the tool parts 27, 28 and the gaps between the fibers of the mesh sublayers 4', 5' and into the hollow space 10. After that, a chemical reaction of the matrix mixture 11 happens— optionally under application of heat—and it passes on into a solid state of aggregation and is consolidated. As soon as the consolidation is largely finished, the tool parts 27, 28 can be opened again and the bonded construction can be removed (cf. FIG. 4d).

In a second process variant, pre-impregnated mesh sublayers 4", 5" of a pre-form of the fiber composite component 1 are used, applying a "prepreg method". These contain already a matrix material 11, e.g. a thermosetting two-component mixture, which is provided in a frozen state (at ca. −18° C.) and becomes mouldable and consolidable only under application of heat.

After arranging the flat section 3 of the metallic component 2 and the two pre-impregnated mesh sublayers 4", 5" next to each other, the positioning of the arrangement between the two tool parts 27, 28 is carried out immediately according to FIG. 4a.

At a temperature that is favourable to the thermosetting matrix material 11, the fiber composite material of the pre-impregnated mesh sublayers 4", 5" is made mouldable. This can be brought about either by tempering the mesh sublayers 4", 5" at room temperature or by heating the tool parts 27, 28 or by means of a special heating unit 37 that shall not be described here. By using heated tool parts 27, 28, the complete fiber composite structure of the sublayers 4", 5" is heated. This means that the forming of the sublayers 4", 5" and the creation of the bond happen at the same time.

The thermosetting two-component mixture that was frozen at the start is melted by the tempering or heating. When the tool parts are closed, pressure is applied and the mesh sublayers 4", 5" are moulded in the cut-out 6. The chemical reaction of the matrix material 11 that starts at the same time makes the matrix material pass on into a solid state of aggregation and consolidate. In addition to this, one or both tool parts 27, 28 can be cooled during this phase of the production. After the consolidation has taken place, the finished Connecting arrangement can be removed from the mould.

The heating unit 37 for the heating of the pre-impregnated mesh sublayers 4", 5" can be installed upstream of the tool parts 27, 28, so that the areas of the mesh sublayers 4", 5" can be inserted between the tool parts 27, 28 already preheated. A more detailed description of such a heating unit 37 can be seen in FIGS. 7a to 7c.

FIGS. 5a to 5d show the four phases of an alternative process according to the invention for the production of the connecting arrangement of a fiber composite component 1 with a metallic component 2 as shown in FIG. 1b.

In order to avoid repetition we shall describe below only the features and components that are different from the process shown in FIGS. 4a to 4d. Identical components with an identical function have the same reference numerals.

In contrast to the process shown in FIGS. 4a to 4d, a molding tool 26" is used which has an upper tool part 27" with an inherently unstable tool surface 34 and a lower tool part 28' with an inherently stable tool surface 33 as shown in FIG. 6. The upper tool part 27" comprises a flexible, pressure-resistant layer of foil (pressure foil) 34 as an inherently unstable tool surface 34 and a flexible pressure space 35 that acts on the pressure foil 34, as can be seen in FIG. 5a which shows the molding tool in an open position. The pressure space 35 can be a pressure pillow that presses onto the pressure foil 34, as has been illustrated in the application example, and in which high pressure is created.

A prepared arrangement consisting of the pre-form of the fiber composite component 1 with two sublayers 4, 5 and the flat section 3 of the metallic component 2 that is positioned in-between, is placed between the tool parts 28', 27" (FIG. 5a).

At the start of the subsequent molding process as shown in FIG. 5b, the tool parts 28', 27" move towards each other and the pressure pillow 35 extends due to a pressure difference with the surroundings. In the application example, the pressure space 35 is pressurised due to high pressure that is created in contrast with the surrounding pressure of the molding tool 26".

As a result of the pressurization, the pressure foil 34 rests against the upper sublayer 4 of the prepared pre-form of the fiber composite component 1 with the flat section 3 of the metallic component 2, whilst the lower tool 28' with the inherently stable even tool surface 33—resting against the lower sublayer 5—creates the counteracting force. Due to the pressurisation of the pressure foil 34, the fiber composite material of the upper sublayer 4 is moulded against the flat section 3 of the metallic component 2 and into the hole 6 in the flat section 3. This leads to the creation of an embossment 7' of the upper sublayer 4 the dimensions of which depend on the form and width of the hole 6 and on the thickness $s_F$ of the sublayer 4 and the thickness $s_M$ of the flat section 3 of the metallic component 2.

FIG. 5c shows the molding tool 26" in the production phase during which the pressure inside the pressure pillow 35 is increased until the embossment 7' created in the upper sublayer 4 has reached its final shape and depth and a contact area 9 has formed between the sublayers 4, 5. The depth of the embossment 7' corresponds approximately to the thickness $s_M$ of the flat section 3 of the metallic component 2. Now the embossment 7' of the sublayer 4 enters in contact with the sublayer 5 that has remained even and with which it forms the contact area 9 with the adhesive surface 12. The only one-sided embossment 7' of the upper sublayer 4 creates a Connecting arrangement with an asymmetrical embossing mould P2.

When the matrix material 11 involved is consolidated and has passed from a liquid into a solid state of aggregation, the pressure in the pressure pillow 35 can be reduced until the pressure pillow 35 is depressurised. Then the tool parts 28', 27" can be opened, the pressure foil 34 can be removed and the completed connecting arrangement withdrawn (FIG. 5d).

The method that uses tool parts 27" with an inherently unstable tool surface 34 has the advantage that the pressure pillow 35 adapts always to the shape and depth of the cut-out 6 at hand. This means that it is not necessary to provide costly milled molding tools which reproduce each of the nubs required for each possible application. This reduces the cost of the production of the molding tools considerably.

In an alternative process variation of the above process shown in FIGS. 5a to 5d which is not illustrated here, the pressure space 35 above the pressure foil 34 is created by means of a not illustrated temperature-pressure-chamber (autoclaves). In this process variation, the molding tool 26" and the arrangement that is to be connected are arranged inside the autoclave. For this, the upper tool part 27" is shaped in a way that the inherently unstable tool surface 34 (pressure foil) limits the pressure space 35 towards the arrangement that is to be connected.

Once the prepared arrangement consisting of a pre-form of the fiber composite component 1 and the flat section 3 of the metallic component 2 that is positioned in-between, has been placed between the tool parts 28", 27", the pressure foil 34 which surrounds the arrangement to be connected is joint together pressure-tight with the lower tool part 28'. Then an all-sided pressure is produced on the pressure foil 34 and the lower tool part 28' by the autoclave, which pushes together the upper tool part 27" with the pressure foil 34 and the lower tool part 28' with the even tool surface 33 and the arrangement to be connected is pressed in analogously with the application example described above in FIG. 5c.

If a tempering of the sublayers 4, 5 is planned, the temperature in the autoclave and with it the temperature of the tool parts 28', 27" can be increased parallel to the pressure increase.

After the matrix material 11 involved has consolidated, the pressure and the temperature in the autoclave can be decreased, the pressure foil 34 can be removed and the finished connecting arrangements can be withdrawn.

FIGS. 7a to 7c show a sectional view of an extract of a production machine for the continuously clocked inline production of a connecting arrangement as shown in FIG. 2a with several embossments 7' corresponding to the connection arrangement as shown in FIG. 1b.

The production plant 36 has a heating unit 37 for the local preheating of the sublayers 4, 5, preferably the sublayer 4 and a molding tool 26' which is positioned downstream of the heating unit 37. As shown in FIG. 6, this molding tool 26' is fitted out with the upper tool part 27" with inherently stable, nubby tool surface 29' and with the lower tool part 28' with inherently stable, even tool surface 33. The tool surface 29' of the upper tool part 27' has a nub 31' for the deep-drawing of a one-sided embossment 7' in the upper sublayer 4. According to this application example, the molding tool 26' of the production plant 37 is designed for the creation of a connecting arrangement with an asymmetrical embossing mould P2, according to the connecting arrangement as shown in FIG. 1b.

The production plant 36 comprises the flat border area of the metallic component 2 which has several cut-outs 6 which are arranged in a line and at equal distance of each other, according to the connecting arrangement to be joined together as shown in FIG. 2a. In the overlap area 16, the border area of the metallic component 2 is covered on both sides by the upper and lower sublayer 4, 5 of the fiber composite component 1. After having been prepared in this way, the metallic component 2 and the fiber composite component 1 are moved along the production plant 36 at a continuous clock pulse of a transport installation that is not illustrated here. The overlap area 16 of both components 1, 2 passes gradually through the heating unit 37 and then the molding tool 26'.

Whilst, according to FIG. 7a, the first embossment 7 of the sublayer 4 is produced in the first cut-out 6 at a first joint in the completely closed molding tool 26' and the sublayer 4 is glued together with the even sublayer 5 in the contact area 9, the sublayer 4 is preheated simultaneously at a second joint that is positioned downstream in the area for the fabrication of the second embossment 7 in the second cut-out 6.

The preheating of the sublayer 4 accelerates the subsequent forming process in the molding tool 26'. In addition, the inline production of preheating and forming of sublayer 4 leads to a significant minimisation of the clock cycle for the complete procedure.

The heating unit 37 works preferably with the help of ultrasound, microwave, contact heat or infrared radiation, which makes a directed, local heating up of the area of sublayer 4 that is to be moulded possible. The process of making sublayer 4 mouldable is carried out precisely and very fast, which leads to a saving of energy and further minimisation of the clock cycle of the procedure.

FIG. 7b shows the production plant 36 after FIG. 7a in a second production phase in which the connection arrangement of the metallic component 2 and the fiber composite component 1 that has been partly joint together has been moved on by one phase of the not illustrated transport unit, so that the first joint has already passed the molding tool 26', the second joint is in the molding tool 26' and the third joint is in the heating unit 37.

FIG. 7c shows the procedures in the production plant 36 during this advanced phase.

As soon as it has left the molding tool 26', the form-fit and firmly bonded connection can cool down and harden completely at the first joint, while in the closed molding tool 26' at the second joint a further form-fit and firmly bonded connection is moulded and glued in the asymmetrical embossing mould P2. Parallel, the sublayer 4 is preheated at the third joint in the area of the third cut-out that is to be moulded.

The pulsing of the procedures is repeated practically continuously until all cut-outs 6 of the longitudinally orientated, flat border area of the metallic component 2 have been connected with the fiber composite component 1 in the way described above.

LIST OF REFERENCE NUMERALS

1. Fiber composite component, flywheel
2. Second component, metallic component, Bighead
3. Flat section of the second component/circular disc-shaped section
4. Upper sublayer of the fiber composite component, 0.1, 0.2
5. Lower sublayer of the fiber composite component, 0.1, 0.2
6. Cut-out, hole
7. Embossment of the upper sublayer
8. Embossment of the lower sublayer
9. Contact area
10. Ring-shaped hollow space
11. Filler material
12. Adhesive surface
13. Central line of the cut-outs
14. Component edge of the metallic component
15. Component edge of the fiber composite component
16. Overlap area
17. Longitudinally orientated hollow space
18. Flat hollow space
19. Intermediate layer
20. Bar-shaped section of the second component
21. Circular central line
22. Longitudinal axis of the bar-shaped section
23. Circumferential edge of the opening of the fiber composite component
24. Circular disc-shaped section of the fiber composite component
25. ring-shaped fiber composite wrapping
26. Molding tool
27. Upper tool part
28. Lower tool part
29. Inherently stable tool surface of the upper tool part
30. Inherently stable tool surface of the lower tool part
31. Nub of the upper tool part
32. Nub of the lower tool part
33. Inherently stable, even tool surface
34. inherently unstable tool surface, pressure-resistant foil layer, pressure foil
35. Pressure space, pressure pillow
36. Production plant
37. Heating unit
$d_{Hole}$ Hole diameter of the cut-out
$S_M$ Thickness of the flat section
$S_F$ Layer thickness of the sublayers
P1 Symmetrical embossing mould
P2 Asymmetrical embossing mould
$l_O$ Width of the overlap
$d_{Mth}$ Diameter of the nub

What is claimed is:

1. A process for the production of a connecting arrangement of a fiber composite component comprising a mesh reinforcement with a second component, the second component comprising at least one flat section having one or more cut-outs which pass through the flat section and the at least one flat section being arranged between at least two sublayers of the fiber composite component, at least one of the at least two sublayers with a layer thickness $S_F$ comprising one or more embossments which have an essentially unchanged layer thickness $S_F$ and which are molded into the one or more cut-outs, wherein the process comprises:

positioning the at least one flat section of the second component between the at least two sublayers of a pre-form of the fiber composite component, so that the at least two sublayers lie flat against the at least one flat section of the second component, at least one of the at least two sublayers being in direct contact with the at least one flat section of the second component, at least one of the at least two sublayers covering and overlapping the one or more cut-outs passing through the at least one flat section of the second component, subsequently shaping in the at least one of the at least two sublayers having a layer thickness $S_F$ the one or more embossments with an essentially unchanged layer thickness $S_F$, wherein shaping comprises molding each of the one or more embossments into a respective cut-out of the one or more cut-outs with a molding tool to form a joined component comprising a form-fit connection between the pre-form of the fiber composite component and the second component, removing the joined component from the molding tool, and consolidating the pre-form of the fiber composite component at least in part only after removing the joined component from the molding tool, wherein a moldability of an upper sublayer and a lower sublayer of the at least two sublayers is different.

2. The process of claim 1, wherein a sublayer of the at least two sublayers is treated thermally before or during molding each of the one or more embossments.

3. The process of claim 1, wherein the molding tool comprises two tool parts which are arranged opposite each other, at least one of the tool parts being formed with a tool surface for molding a respective sublayer into the one or more cut-outs.

4. The process of claim 3, wherein the tool surface comprises one or more nubs which correspond to at least a number and a form of the one or more cut-outs.

5. The process of claim 1, wherein in an area of the one or more cut-outs the at least two sublayers are connected directly.

6. The process of claim 1, wherein in an area of the one or more cut-outs the at least two sublayers are connected indirectly.

7. The process of claim 1, wherein the upper and lower sublayers are molded into the one or more cut-outs in an identical way, so that the one or more embossments comprise embossments in the upper and lower sublayers which are mirror-symmetrical in form and arrangement.

8. The process of claim 1, wherein the upper and lower sublayers are molded into the one or more cut-outs in a non-identical way, so that the one or more embossments comprise embossments in the upper and lower sublayers which are asymmetrical in form and arrangement.

9. The process of claim 1, wherein the positioning is performed so that two of the at least two sublayers are in direct contact with the at least one flat section of the second component.

10. The process of claim 1, wherein the mesh reinforcement comprises carbon fibers.

11. The process of claim 1, wherein the molding tool for the shaping of one or more embossments in at least one of the at least two sublayers is not heated.

12. A process for the production of a connecting arrangement of a fiber composite component comprising a mesh reinforcement with a second component, the second component comprising at least one flat section having one or more cut-outs which pass through the flat section and the at least one flat section being arranged between at least two sublayers of the fiber composite component, at least one of the at least two sublayers with a layer thickness $S_F$ comprising one or more embossments which have an essentially unchanged layer thickness $S_F$ and which are molded into the one or more cut-outs, wherein the process comprises:
  positioning the at least one flat section of the second component between the at least two sublayers of a pre-form of the fiber composite component, so that
  the at least two sublayers lie flat against the at least one flat section of the second component, at least one of the at least two sublayers being in direct contact with the at least one flat section of the second component,
  at least one of the at least two sublayers covering and overlapping the one or more cut-outs passing through the at least one flat section of the second component,
  subsequently shaping in the at least one of the at least two sublayers having a layer thickness $S_F$ the one or more embossments with an essentially unchanged layer thickness $S_F$, wherein shaping comprises molding each of the one or more embossments into a respective cut-out of the one or more cut-outs with a molding tool to form a joined component comprising a form-fit connection between the pre-form of the fiber composite component and the second component,
  removing the joined component from the molding tool, and
  consolidating the pre-form of the fiber composite component at least in part only after removing the joined component from the molding tool,
  wherein a hollow space in a border area between a cut-out and an embossment is filled with a filler material.

13. The process of claim 12, wherein the filler material comprises a matrix material of the fiber composite component.

14. The process of claim 12, wherein a sublayer of the at least two sublayers is treated thermally before the shaping.

15. The process of claim 12, wherein the molding tool comprises two tool parts which are arranged opposite each other, at least one of the tool parts being formed with a tool surface for molding a respective sublayer into the one or more cut-outs.

16. The process of claim 15, wherein the tool surface comprises one or more nubs which correspond to at least a number and a form of the one or more cut-outs.

17. The process of claim 12, wherein in an area of the one or more cut-outs the at least two sublayers are connected directly.

18. The process of claim 12, wherein in an area of the one or more cut-outs the at least two sublayers are connected indirectly.

19. The process of claim 12, wherein an upper and a lower sublayer of the at least two sublayers are molded into the one or more cut-outs in an identical way, so that the one or more embossments comprise embossments in the upper and lower sublayers which are mirror-symmetrical in form and arrangement.

20. The process of claim 12, wherein an upper and a lower sublayer of the at least two sublayers are molded into the one or more cut-outs in a non-identical way, so that the one or more embossments comprise embossments in the upper and lower sublayers which are asymmetrical in form and arrangement.

* * * * *